United States Patent
Neystadt et al.

(10) Patent No.: US 8,954,897 B2
(45) Date of Patent: Feb. 10, 2015

(54) PROTECTING A VIRTUAL GUEST MACHINE FROM ATTACKS BY AN INFECTED HOST

(75) Inventors: John Neystadt, Kfar Saba (IL); Noam Ben-Yochanan, Petach Tikya (IL); Nir Nice, Kfar Veradim (IL)

(73) Assignee: Microsoft Corporation, Redmond, WA (US)

( * ) Notice: Subject to any disclaimer, the term of this patent is extended or adjusted under 35 U.S.C. 154(b) by 1137 days.

(21) Appl. No.: 12/199,812

(22) Filed: Aug. 28, 2008

(65) Prior Publication Data

US 2010/0058432 A1 Mar. 4, 2010

(51) Int. Cl.
*G06F 17/00* (2006.01)

(52) U.S. Cl.
USPC .................. 716/1; 726/2; 726/23; 726/24

(58) Field of Classification Search
USPC ............................. 726/1, 2, 23, 24
See application file for complete search history.

(56) References Cited

U.S. PATENT DOCUMENTS

| | | | |
|---|---|---|---|
| 7,076,655 | B2 | 7/2006 | Griffin et al. |
| 7,370,166 | B1 | 5/2008 | Ramesh et al. |
| 7,370,324 | B2 | 5/2008 | Goud et al. |
| 2002/0194496 | A1 | 12/2002 | Griffin et al. |
| 2004/0015694 | A1 | 1/2004 | Detreville |
| 2004/0059900 | A1* | 3/2004 | Backman et al. .............. 713/1 |
| 2005/0132122 | A1 | 6/2005 | Rozas |
| 2007/0074192 | A1 | 3/2007 | Geisinger |
| 2007/0257105 | A1 | 11/2007 | Owen et al. |
| 2008/0046990 | A1 | 2/2008 | Narayanaswami et al. |
| 2008/0134176 | A1 | 6/2008 | Fitzgerald et al. |
| 2008/0183996 | A1 | 7/2008 | Field |
| 2008/0215728 | A1 | 9/2008 | Li |
| 2009/0138877 | A1* | 5/2009 | Fitzgerald et al. .............. 718/1 |

FOREIGN PATENT DOCUMENTS

| | | |
|---|---|---|
| CN | 1885788 A | 12/2006 |
| CN | 1940805 A | 4/2007 |
| CN | 101071463 A | 11/2007 |

(Continued)

OTHER PUBLICATIONS

International Search Report in corresponding PCT Application PCT/US2009/052438, dated Feb. 26, 2010, 3 pages.

(Continued)

*Primary Examiner* — Baotran N To
(74) *Attorney, Agent, or Firm* — Ben Tabor; Kate Drakos; Micky Minhas

(57) ABSTRACT

In a virtualization environment, a host machine on which a guest machine is operable is monitored to determine that it is healthy by being compliant with applicable policies (such as being up to date with the current security patches, running an anti-virus program, certified to run a guest machine, etc.) and free from malicious software or "malware" that could potentially disrupt or compromise the security of the guest machine. If the host machine is found to be non-compliant, then the guest machine is prevented from either booting up on the host machine or connecting to a network to ensure that the entire virtualization environment is compliant and that the guest machine, including its data and applications, etc., is protected against attacks that may be launched against it via malicious code that runs on the unhealthy host machine, or is isolated from the network until the non-compliancy is remediated.

8 Claims, 7 Drawing Sheets

(56) References Cited

FOREIGN PATENT DOCUMENTS

| EP | 1647886 | | 4/2006 |
|----|---------|----|--------|
| EP | 1906333 | A2 | 4/2008 |
| EP | 1942603 | A2 | 7/2008 |
| JP | 2007226277 | A | 9/2007 |
| JP | 2008165794 | A | 7/2008 |
| WO | 2005096121 | A1 | 10/2005 |
| WO | 2007007805 | A1 | 1/2007 |
| WO | 2007136192 | A1 | 11/2007 |
| WO | 2008054999 | A2 | 5/2008 |

OTHER PUBLICATIONS

"Secure Configuration and Management of VMware Infrastructure", Retreived at<<http://www2.catbird.com/our_services/vm_policy_compliance.php>>, Aug. 21, 2008, pp. 1-3.

"AppSense and VMware Virtual Desktop Infrastructure", Retreived at<<http://www.appsense.com/files/documentation/AppSense_VDI_1.3_UK.pdf>>, pp. 2.

"Configuresoft Configures Intelligent Virtualization", Retreived at<<http://www.on-demandenterprise.com/offthewire/26051204.html>>, Aug. 21, 2008, pp. 1-8.

"End-Point Integrity Check", Retreived at<<http://www.mojopac.com/enterprise/files/whitepapers/endpoint_integrity_check.pdf>>, Jul. 16, 2007, pp. 2.

Chinese Patent Application No. 200980134101.5, Office Action dated Mar. 29, 2013, 10 pages, including English translation.

English translation of Abstract of CN 1940805, 1 page.

Chinese Patent Application No. 200980134101.5, Response to Office Action dated Apr. 26, 2013, 10 pages, including English translation.

Chinese Patent Application No. 200980134101.5, Third Office Action dated Nov. 8, 2013, 11 pages, including English translation.

European Patent Application No. 09810429.2, Extended European Search Report dated Oct. 17, 2013, 10 pages.

European Patent Application No. 09810429.2, Communication dated Nov. 6, 2013, 1 page.

Debar H, et al., "Towards a taxonomy of intrusion-detection systems", Computer Networks, Elsevier Science Publishers B.V., Amsterdam, NL, vol. 31, No. 8, Apr. 23, 1999, pp. 805-822.

Chinese Patent Application No. 200980134101.5, Office Action dated Aug. 5, 2013, 8 pages, including English translation.

Chinese Patent Application No. 200980134101.5, Response to Office Action dated Aug. 9, 2013, 37 pages, including English translation of claims.

Chinese Patent Application No. 200980134101.5, Amendment dated Jan. 8, 2014, 13 pages, including English translation).

Japanese Patent Application No. 2011-525050, Office Action dated Nov. 12, 2013, 4 pages.

Japanese Patent Application No. 2011-525050, English translation of Office Action dated Nov. 12, 2013, 4 pages.

* cited by examiner

PROTECTING A VIRTUAL GUEST MACHINE FROM ATTACKS BY AN INFECTED HOST

BACKGROUND

Virtualization is an important strategy with wide-reaching implications that enables information technology ("IT") infrastructure to be more effectively and efficiently utilized by isolating or decoupling one computing resource from others. This strategy may be applied to all layers of a computing stack, from the data center to the desktop. Rather than locking the various layers together as is typical with a static computing environment—the operating system ("OS") to the hardware, the application to the OS, and the user interface to the local computing device—virtualization aims to loosen the direct reliance these parts have on one another.

Such data center-to-desktop virtualization makes it possible to quickly deploy new capabilities without needing to acquire new hardware and configure components. Testing requirements and application compatibility issues are reduced, automating processes is simplified, and disaster recovery capabilities are easier to implement. On the desktop, virtualization can help create an infrastructure that enables consumers or enterprise employees to access the applications they need, no matter where they are located. For example, using virtualization products and technology to implement a guest machine, users can access their personalized desktop, with all of their applications, data, settings, and preferences intact using a host machine from virtually any location.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

In a virtualization environment, the threat of a guest machine being attacked by an unhealthy infected host machine on which a guest machine is operable is addressed by an arrangement in which the host machine is monitored to determine if it is healthy by being compliant with applicable policies (such as being up to date with the current security patches, running an anti-virus program, certified to run a guest machine, etc.) and free from malicious software or "malware" that could potentially disrupt or compromise the security of the guest machine. If the host machine is found to be non-compliant, then the guest machine is prevented from either booting up on the host machine or connecting to a network to ensure that the entire virtualization environment is compliant and that the guest machine, including its data and applications, etc., is protected against attacks that may be launched against it via malicious code that runs on the unhealthy host machine, or is isolated from the network until the non-compliancy can be remediated.

In various illustrative examples, a guest health agent running on the guest machine is configured to communicate with a host health agent on the host machine during the guest's boot up process to check the compliance of the host with one or more compliance policies that are stored on the guest or received from a compliance policy server. If the host machine is found to be non-compliant then the guest machine may display an error message to the user so that the host machine's non-compliancy can be remediated, for example, by installing the appropriate patch, missing anti-virus application or update, etc. If the host machine is already compliant, or after it has been remediated to become compliant, the guest machine can complete its boot process to implement the virtualization environment so that the user's desktop, applications, and data become available for use on the guest machine.

The compliance status of the host machine may also be periodically checked after the virtualization environment is initialized and operational. For example, if the guest machine attempts a connection to a network such as an enterprise or corporate network, the guest health agent may request a compliance statement from the host health agent that indicates the current health of the host machine. The compliance statement can be forwarded by the guest health agent to a remote policy enforcement point on the network to verify compliance of the host machine with one or more policies required by the enforcement point before network access is granted. If the compliance statement indicates that the host machine does not comply with applicable policies (which indicates that the host is at risk and has high chances of being infected and/or compromised by malware), then network access is denied. The user may be provided with an error message so that the non-compliancy may be remediated before network access is attempted again.

In another example of checking of the host machine's health, if the integrity of the virtualization environment is suspected of being compromised, then the guest health agent may request a compliance statement from the host health agent to verify and/or confirm continued compliance with applicable policies. For example, a security assessment under an Enterprise Security Assessment Sharing ("ESAS") security model may be received at an endpoint (i.e., a security gateway device) which is arranged to monitor security-related information in a network. The received security assessment may trigger a suspicion that the virtual environment is compromised. The compliance statement can be used to determine if a security incident involving the host machine has occurred to confirm or reject the suspicion, or trigger additional analyses of the host. If the host machine is confirmed to be compromised, operations on the guest machine may be suspended, network connection requests denied, and the like, until the security incident involving the host has been addressed and remediated.

Advantageously, the present arrangement for protecting the guest machine against attacks from malware on the host enables security to be enhanced in the virtualized environment. While the basic virtualization principle of decoupling computing resources is maintained, security analyses of the guest and host machines are chained for purposes of checking and enforcing compliance of the host machine to applicable policies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Virtualization is a disruptive technology that is dramatically changing computing today in many ways. For example, virtualization enables users (i.e., consumers or business users such as employees of an enterprise) to avoid having to carry their own laptop computer when away from their desktop PC (personal computer). Instead, they can carry an image of their desktop on a portable storage device, such as a USB (Universal Serial Bus) drive, and run the desktop as a virtual guest on any host computer, such as a home PC, a publicly accessible PC at a hotel kiosk, airport, library, or cyber cafe, a friend's home computer, etc.

Figure 1:
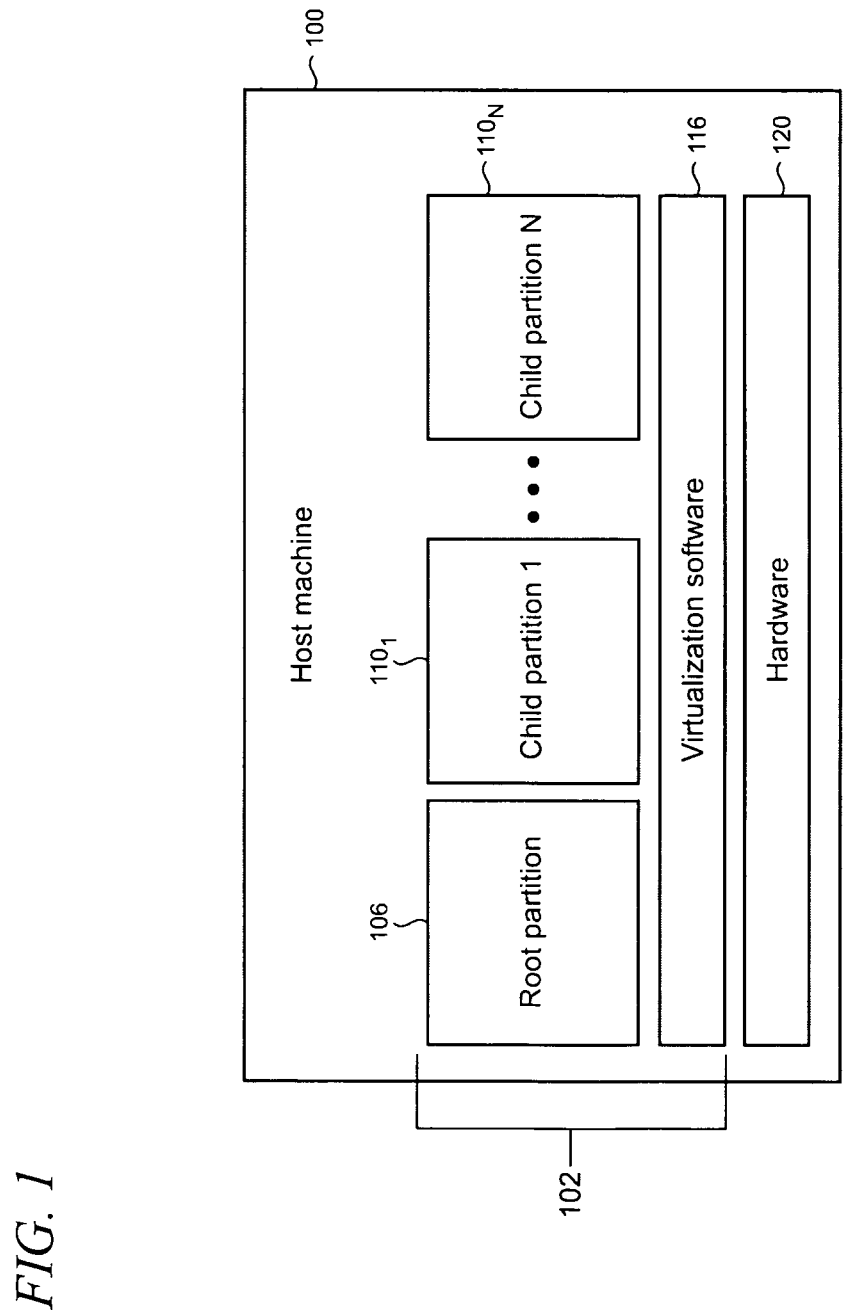
FIG. 1 shows a virtualization architecture that is operable on a host machine.

A virtualization environment can be set up on a host machine 100 such as a PC by creating multiple logical units of isolation called partitions in which operating systems of the host and one or more guest machines execute. As shown in FIG. 1, a virtualization environment 102 typically includes a root partition 106 that may be used to create one or more child partitions $110_1 \ldots _N$ that support the guest machines. In some cases, a child partition can also spawn further child partitions of its own. The root partition 106 contains the operating system for the host machine and has direct access to the host's hardware including the central processor, memory, and other hardware resources.

A virtualization software layer 116 is arranged between the partitions and the hardware 120 on the host machine. In this example, the virtualization software includes a hypervisor that exposes a virtual view of the hardware 120 to the child partitions 110 over a logical channel in the layer 116 that supports inter-partition communication. Requests to the virtual hardware from guest machines are directed to the parent or root partition over the logical channel. The root partition will then manage the requests and respond back over the channel. The entire request and response process is completely transparent to the operating systems running on the guest machines.

While virtualization performs well and provides significant flexibility and economic value, a potential security threat exists when the host machine is infected with malware such as a virus, trojan horse, key logger, etc. Once the guest machine is started on a child partition 110, the malware on the host may then be provided with an opportunity to steal or tamper with data on the guest. In addition, if the guest machine is used to access a network such as a remote enterprise network, the malware may gain unauthorized access to resources and data on the network through the guest machine.

Security solutions such as NAP/NAC (Network Access Protection/Control) are available to check the health of a guest machine by verifying its conformance to a given compliance policy. For example, the policy may specify that the guest machine be fully updated with the latest security patches, have an anti-virus or anti-malware software program running that is up to date with current signatures, have a properly configured software firewall, and the like. However, current solutions perform the compliance check only for the guest machine and ignore the health of the host machine. Accordingly, even when the guest machine is found to be fully compliant and healthy, current solutions do not address the exposure of the guest to malware that may be resident on the host machine.

Figure 2:
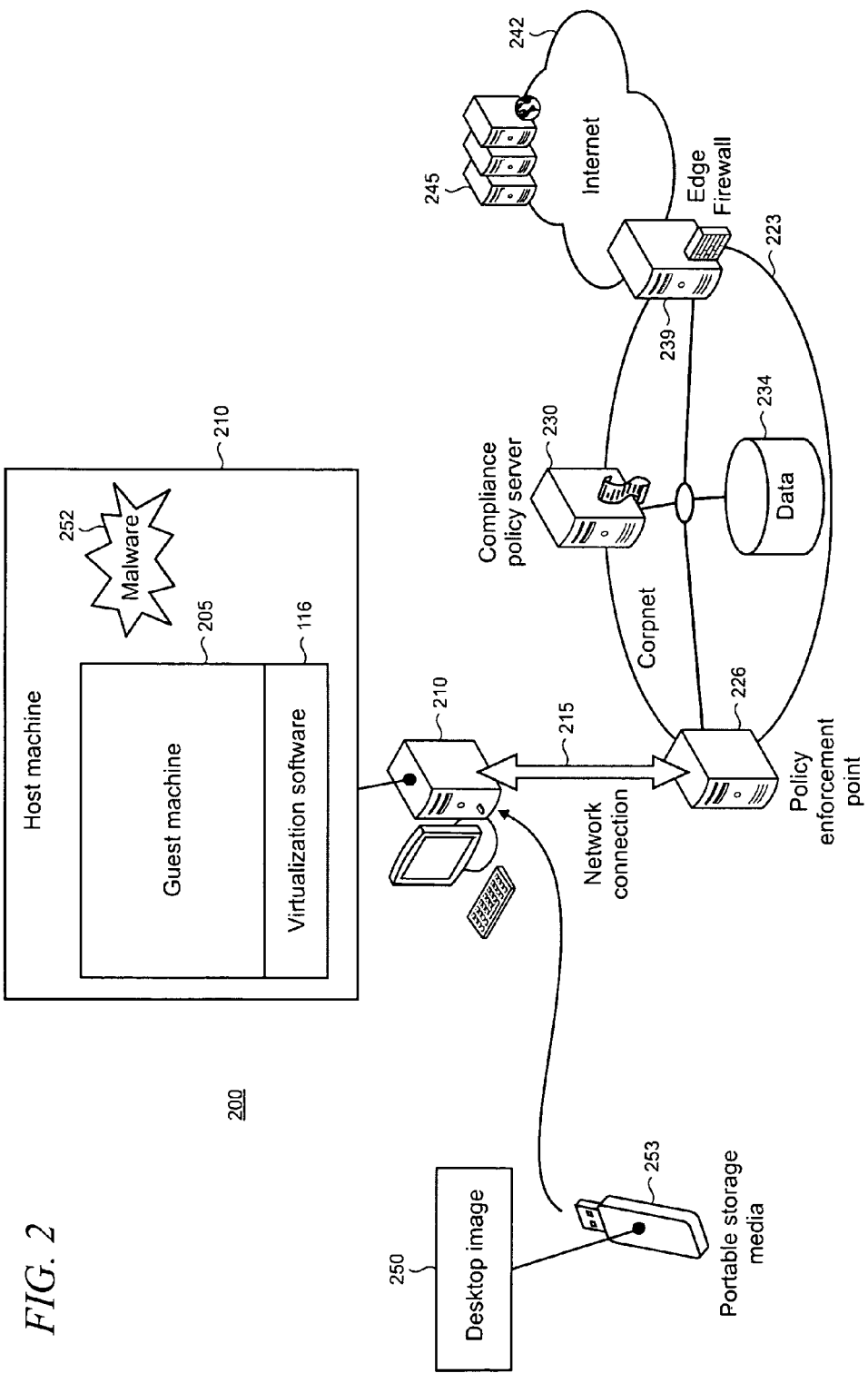
FIG. 2 shows an illustrative virtualized environment in which a guest machine is operable on a host machine having a connection to a network.

FIG. 2 shows an illustrative virtualization environment 200 in which the present arrangement for protecting a guest machine from attacks by an infected host may be practiced. A virtual guest machine 205 is operable on a host machine 210 such as a PC that has a connection 215 to a network such as a remote corporate network 223 ("corpnet"). The network connection 215 may be implemented using one of a variety of remote networking protocols including, for example, VPN (Virtual Private Network), SSL (secure sockets layer) based VPN, VPN over IPSec (Internet Protocol Security), and the like. Alternatively, the network connection 215 may be implemented using global SCM (secure content management) infrastructure, for example as described in U.S. patent application Ser. No. 12/164,078, filed Jun. 29, 2008, entitled "Globally Distributed Infrastructure for Secure Content Management" owned by the assignee of the present application and hereby incorporated by reference in its entirety.

At the remote end of the network connection 215 in the corpnet 223 is a policy enforcement point 226 along with a compliance policy server 230 which are each described in more detail below. Enterprise resources and data (collectively identified by data 234 in FIG. 2) are available in the corpnet 223 and typically include some proprietary, sensitive, and/or confidential information that is desired to be protected against theft and malicious attacks. The corpnet 223 is typically arranged to support other devices such as client computers, workstations, laptops, mobile devices and the like (not shown) as may be required to support the IT needs of employees of a business or enterprise. The other devices may be either locally deployed with the corpnet 223 or remotely deployed from the corpnet in some cases.

An edge firewall 239 is located at the perimeter in the corpnet 223 which is configured to monitor traffic between the corpnet and an external network such as the Internet 242. External resources 245 such as e-mail and web servers and databases are typically accessible over the Internet 242.

A user may create the virtualization environment 200 by loading the user's desktop image 250 to the host machine 210 from a portable storage media 253 such as the USB drive shown. The portable storage media 253 may also include the virtualization software 116 in some cases. When desktop image 250 is transferred to a child partition and the virtualization software is operable, the guest machine 205 is instantiated on the host machine 210 and virtualizes the user's computer including desktop, applications, data, settings, and preferences on the host. It is noted that the particular mix of objects (i.e., applications, data, etc.) that are virtualized on the guest machine 205 can vary by implementation and not all objects need to be virtualized in every implementation.

The host machine 210 is typically remotely located from the corpnet 223 and may include publicly accessible PCs such as those at kiosks, libraries, etc., or home-based computers that often are not as closely controlled or monitored as their corpnet counterparts from a security protection standpoint. As a result, malware (as indicated by reference numeral 252) may infect the host machine which has the potential for compromising the guest machine 205.

Figure 3:
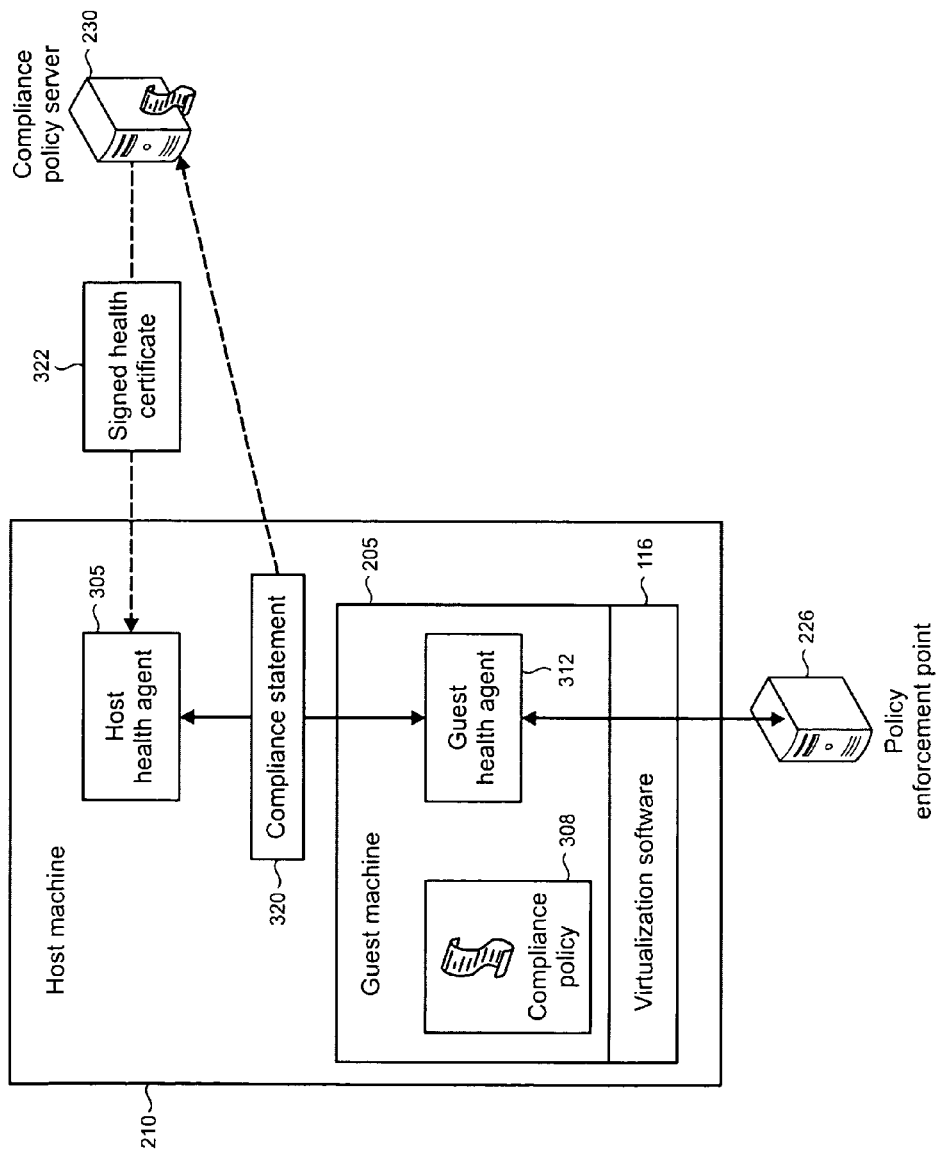
FIG. 3 shows illustrative components that are operable on the guest and host machines.

To deal with malware threats on the host machine 210, as shown in FIG. 3, a host health agent 305 is configured to run on the host and check host conformance with a compliance policy 308. The compliance policy 308 may be stored locally on the guest machine 205 when it is first initiated on the child partition in some implementations or may be retrieved from the compliance policy server 230 (FIG. 2) in others. The compliance policy 308 will typically specify a minimum acceptable health condition for the host machine 210. Such condition can vary by implementation or be configured by a security administrator. For example, the compliance policy 308 may specify that the host machine 210 be patched with the latest security updates and be protected by an anti-virus product or service. While a single policy is illustratively used in this example, in some applications multiple compliance policies may be utilized.

The host health agent 305 and locally stored compliance policy may be stored on the portable storage media 253 (FIG. 2) and respectively transferred to the host and guest machines during initiation. In some implementations, the host health agent 305 may be implemented as part of a NAP client or other component or agent that may run on the host machine 210 or otherwise include similar NAP functionality.

The host health agent 305 can check various factors that are indicative of the health of the host machine including, for example, security patch status (where the term "status" means what the last patch was and when it was installed), presence of anti-virus and/or anti-malware software, status of updates of virus or malware signatures, presence of specific certificate/file/registry key to indicate the host machine is certified to run the guest machine (e.g., the host machine is an IT asset of the enterprise or corpnet), presence of an appropriately configured software firewall, etc. It is noted that the factors listed here are intended to be illustrative and that other factors may be utilized as may be required to meet the needs of a particular implementation.

The host health agent 305 is further configured to communicate with a corresponding guest health agent 312 that is a component of the guest machine 205. In particular, the host health agent 305 may generate a compliance statement 320 that is indicative of the health of the host machine after the host health agent performs the checks. The compliance statement 320 may be sent by the host health agent 305 to the guest health agent 312 in response to a request from the guest health agent, for example. Alternatively, the host health agent 305 may send the compliance statement 320 at its own initiative, upon the occurrence of other triggers or conditions, or at predetermined times.

The host health agent 305 can be configured to send the compliance statement 320 to the compliance policy server 230 (or the policy enforcement point 226) instead of the guest health agent 312. In this case, the compliance policy server 230 can check the compliance statement 320. If the host machine 210 is found to be compliant with applicable policy, then the compliance policy server 230 can issue a signed health certificate 322 to the host health agent 305. When the host health agent 305 receives a request from the guest health agent 312, it can send the signed health certificate 322 to the guest health agent.

The guest health agent 312 may use the compliance statement 320 (or the signed health certificate 322) locally to determine if a safe virtualization environment exists in which the guest machine 205 may operate. In addition, the guest machine 205 can forward the compliance statement 320 (or signed health certificate 322) to the policy enforcement point 226 when accessing an external network or corpnet 223 (FIG. 2). Each of these uses is further illustrated in the usage scenarios shown in the flowcharts in FIGS. 4 and 5 below. The flowcharts refer to the elements shown in FIGS. 2 and 3 and described in the accompanying text.

Figure 4:
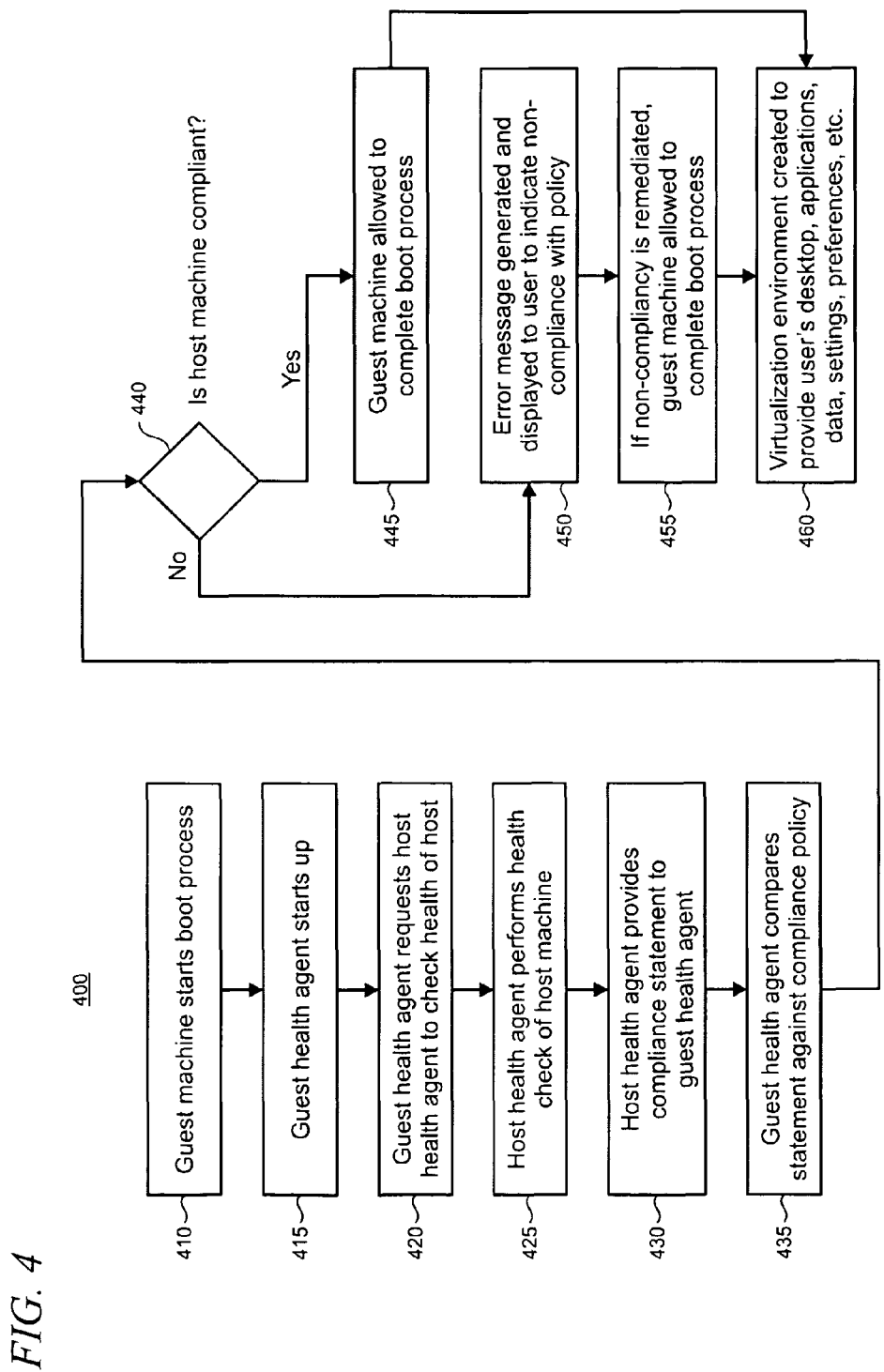
FIG. 4 shows a flowchart of a first illustrative usage scenario in which the health of the host machine is checked at guest machine boot up.

FIG. 4 shows a flowchart of a first illustrative usage scenario 400 in which the host health agent 305 checks the health of the host machine 210 at some point in the boot up or initialization process of the guest machine 205 on the host. For example, the check can occur whenever the user attempts to start the desktop image 250 as guest machine on an unknown host machine that may be located in a public place like a library, kiosk, or cyber cafe. The scenario 400 begins when the guest machine 205 starts the boot process (as indicated by reference numeral 410) at which point the guest health agent 312 starts up (415).

The guest health agent 312 makes a request to the host health agent 305 to check the health of the host machine 210 (420) so that the host's compliance with the policy 308 may be ascertained. As noted above, the particular factors checked and requirements imposed by the policy 308 can vary by implementation. The host health agent 305 performs the health check (425) responsively to the request and provides the compliance statement 320 to the guest health agent 312 (430). Alternatively, as noted above, the host health agent 305 may provide the compliance statement 320 to the compliance policy server 230 and receive back a signed health certificate 322 if the host machine 210 is determined to be compliant with applicable policy.

The guest health agent 312 compares the compliance statement 320 received from the host health agent 305 against the compliance policy 308 (435). If the host machine 210 is determined to be compliant (or if the signed health certificate 322 indicates compliancy) (at decision block 440) then the guest machine 205 is allowed to continue its boot process through its conclusion (445). This enables the virtualization environment 200 to be created so that one or more of the user's desktop, applications, settings, preferences, data, etc., are provided on the guest machine 205 (460).

If the guest health agent is not present on host machine or the comparison of the compliance statement 320 against the policy 308 indicates that the host machine 210 does not comply with the policy, then an error message may be displayed via a user interface running on the guest machine 205 (450). The error message can give notice of the particulars of the non-compliancy of the host machine 210 so that the user can attempt to remediate the issue on the host. For example, if the host machine 210 is missing a critical security patch, the user could download the patch and install it to bring the host into compliance with the policy 308. Once so remediated, the guest machine 205 can continue with the boot process (455) so that the virtualization environment is created for the user (460).

Figure 5:
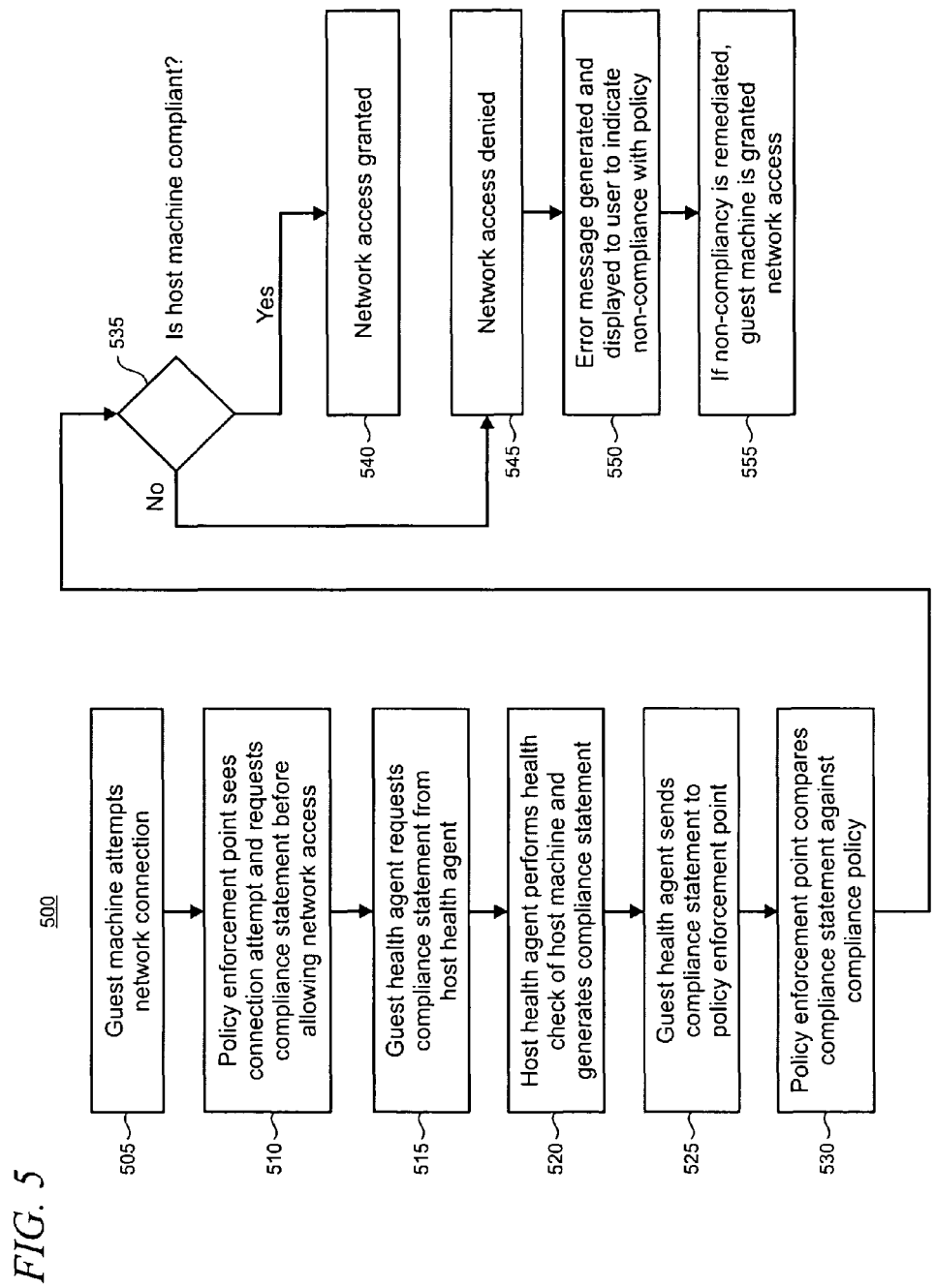
FIG. 5 shows a flowchart of a second illustrative usage scenario in which the health of the host machine is periodically checked.

FIG. 5 shows a flowchart of a second illustrative usage scenario 500 in which the host health agent 305 periodically checks the health of the host machine 210. In this example, the check is performed when the guest machine 205 attempts to access an external network such as the corpnet 223 (505).

When the policy enforcement point 226 sees the attempt over the network connection 215, it will request a compliance statement be produced before allowing the connection to the corpnet 223 to be completed (510). In response, the guest health agent 312 requests the compliance statement 320 from the host health agent 305 (515) and the host health agent performs a health check of the host machine 210 to thereby generate the compliance statement (520). Alternatively, as noted above, the host health agent 305 may provide the compliance statement 320 to the compliance policy server 230 and receive back a signed health certificate 322 if the host machine 210 is determined to be compliant with applicable policy.

The guest health agent 312 forwards the compliance statement 320 to the policy enforcement point 226 (525). The policy enforcement point 226 compares the statement against the applicable compliance policy (530). Typically, the applicable policy will be provided by the compliance policy server 230. In addition, as noted above in the case of locally stored policy 308, one or multiple policies may have applicability to the host machine 210 in a given implementation. If the compliance statement from the host health agent 305 indicates that the host machine 210 is compliant with the applicable policy (or if the signed health certificate 322 indicates compliancy) (at decision block 535), then the policy enforcement point 226 grants the guest machine 205 access to the corpnet 223 (540).

If the guest health agent is not present on host machine or the comparison of the compliance statement 320 against the policy served by the compliance policy server 230 indicates that the host machine 210 does not comply with the policy, then policy enforcement point 226 denies network access (545) and an error message may be displayed via a user interface running on the guest machine 205 (550). The error message can give notice of the particulars of the non-compliancy of the host machine 210 so that the user can attempt to remediate the compliancy issues on the host. For example, if the host machine 210 is missing the latest update of malware signatures for an anti-virus product that is running on the host, the user could download the signature update and install it to bring the host into compliance with the applicable policy. If so remediated, the guest machine 205 is granted network access by the compliance enforcement point 226 (555) so that the user at the guest machine can write and read to and from the data store 234 and/or access Internet based resources 245.

The host health agent 305 may also be utilized for checking the health of the host machine 210 under other circumstances. For example, if the integrity of the virtualization environment is suspected of being compromised, the guest health agent may request a health statement from the host health agent to verify and/or confirm continued compliance with applicable policies. In one illustrative example, a security assessment under the ESAS security model may be received to trigger such suspicion.

Figure 6:
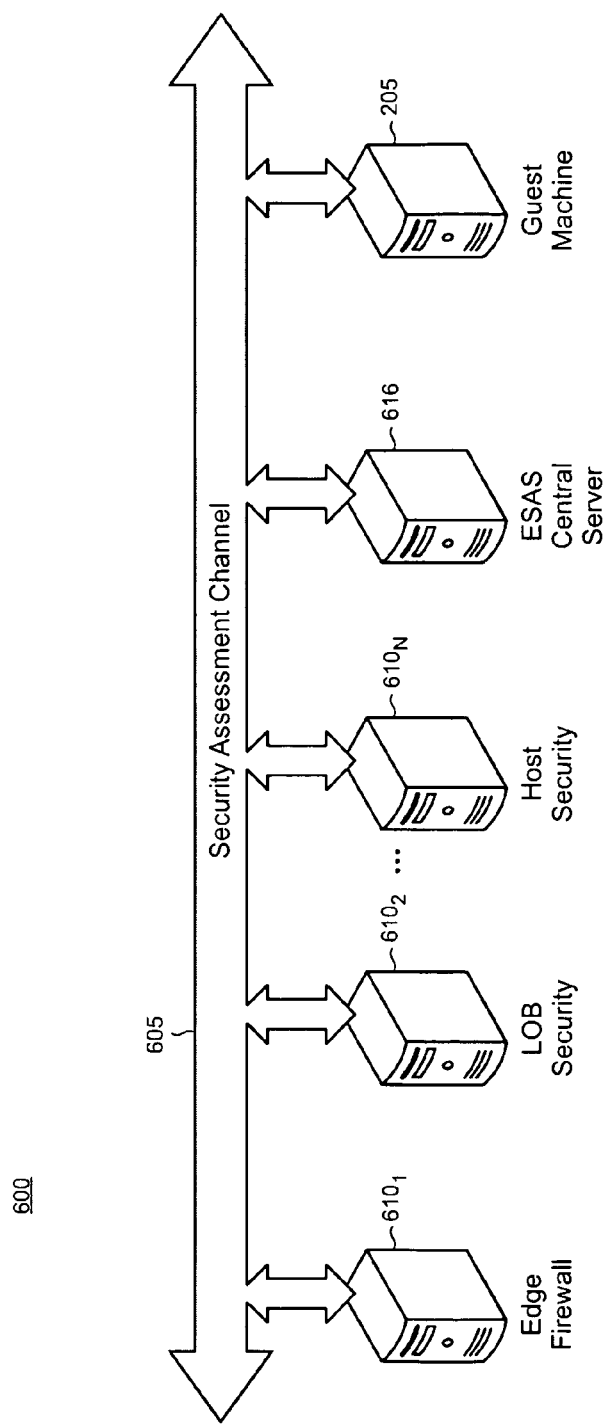
FIG. 6 shows an illustrative enterprise security assessment sharing ("ESAS") arrangement in which a channel is provided to enable a security assessment to be shared among multiple endpoints.

FIG. 6 shows an illustrative ESAS arrangement 600 in which a channel 605 is provided to enable a security assessment to be shared among multiple security gateways called endpoints $610_{1, 2 \ldots N}$. An ESAS-based security model for enterprise network security is described in U.S. patent application Ser. No. 11/724,061, filed Mar. 14, 2007, entitled "Enterprise Security Assessment Sharing" owned by the assignee of the present application and hereby incorporated by reference in its entirety which provides enhanced detection of security incidents and enables a single enterprise-wide view to enable security administrators to define and enforce clear, simple, and unified enterprise-wide response policies for automatic responses to security incidents.

ESAS relies upon a semantic abstraction, called a security assessment that enables sharing of security-related information between endpoints in an enterprise security environment. In this example, the enterprise security environment can include the corpnet 223 (FIG. 2) and the users and machines it supports (including the guest machine 205 and host machine 210), or encompass a distributed arrangement using global SCM infrastructure, for example.

A security assessment is defined as a tentative assignment by an endpoint of broader contextual meaning to information (i.e., data in some context) that is collected about an object of interest in the environment such as a computer, user, service, website, data, or the enterprise as a whole. The security assessment utilizes a concise vocabulary for an endpoint to declare that an object in the environment falls into a particular assessment category such as "compromised" or "under attack" along with the severity (e.g., low, medium, high, critical) of the detected incident.

A security assessment is tentative because it is subject to some uncertainty and is valid for a limited period of time. The tentative nature of a security assessment is reflected in two of its components: a fidelity field which expresses the level of confidence the endpoint has in its assignment of contextual meaning, and a time-to-live ("TTL") field which reflects the endpoint's estimate of the time period for which the security assessment is expected to be valid. Thus, for example, a security assessment may be used by an endpoint to declare, in light of that endpoint's current understanding of one or more security incidents, that a particular machine is compromised, with a critical level of severity, with medium fidelity, and having a TTL of 30 minutes.

A variety of types of security assessment may be utilized in any given enterprise network environment. These may include, for example, various combinations of assessment category and object type.

ESAS typically provides a number of advantages. By employing a security assessment having a concise vocabulary, overall data complexity in the enterprise is drastically reduced and only meaningful information is shared between endpoints. Use of the security assessment also eliminates the need to collect large amounts of raw data in a central storage location, and thereby enables highly scalable enterprise security solutions to be built on a very cost effective basis. In addition, a new endpoint may be readily deployed with on-demand extensibility. Security assessments may be shared between the new endpoint and existing endpoints without the need to reconfigure any of the response policies within existing endpoints. The new endpoint simply functions as a new source of security assessments using a semantic abstraction that the existing endpoints already understand. The utilization of security assessments also enables enterprise-wide security policies to be established using a very compact and clear methodology, without needing to understand all of the possible security events that every endpoint may generate in the enterprise, and then try to describe the responsive action for each event.

Under the ESAS security model, enterprise network users are subject to security policies which govern the utilization of IT assets in an enterprise environment. In particular, the security policies are typically enforced, at least in part, by the endpoints 610. The security policies typically govern which users may access information, what kinds of information may be accessed and when, permissible and impermissible behaviors, auditing practices in the enterprise, etc.

The endpoints 610 may include, for example, security products that monitor, assess, and take action with respect to different parts of security-related data within the enterprise. For example as shown in FIG. 6, the corpnet 223 may utilize a combination of security products including an edge firewall product $610_1$, one or more specialized line-of-business security gateway products $610_2$, and a host security product $610_N$. While not utilized in this particular illustrative example, other types of security products may also be utilized depending on the needs of a particular implementation including, for example, business security gateways, information leakage protection gateways, network intrusion detection system ("NIDS") products including web application protection products, UTM (Unified Threat Management) products, SEM/SIM (Security Event Management/Security Incident Management) products, NAP products, and operational health monitoring and configuration management products (e.g., Microsoft Windows® Software Update Services).

An edge firewall is a security product that is arranged to protect the corpnet 223 from Internet-based threats while providing users with remote access to applications and data. The edge firewall may be embodied by, for example, a Microsoft Internet Security and Acceleration® ("ISA") server. The line-of-business security products protect various line-of-business applications including, for example, an e-mail application such as Microsoft Exchange® that is used in the corpnet 223 to provide anti-virus and anti-spam protection. A commercial example of the host security product is Microsoft Corporation's Threat Management Gateway ("TMG") product which provides unified malware protection for the enterprise's desktops, laptops, and server operating systems.

In most typical ESAS implementations, a specialized endpoint called an ESAS central server 616 may also be utilized. The ESAS central server 616 is coupled to the security assessment channel 605 and performs as a centralized audit point by subscribing to all security assessments, logging the security assessments, and also logging the local actions taken by endpoints 610 in response to security incidents in the environment. The ESAS central server 616 provides administrators with a comprehensive view of the history and current status of the enterprise as a whole and of each endpoint 610. The utilization of the security assessments enables an administrator to compactly and efficiently configure response policies to incidents that are detected across the entire enterprise. The security assessments function as natural anchors, or starting points, to define enterprise-wide security response policies. A streamlined and consistent management interface is thus enabled to define the desired responses for each type of security assessment across the entire enterprise.

The endpoints 610 are further enabled with functionality to publish security assessments onto a security assessment channel operating in the environment, as well as subscribe to a subset of available security assessments published by other endpoints. The security assessments existing in the environment that are active (i.e., those having a TTL which indicates the assessments are still valid) function to provide a security context that gives such endpoint 610 a new way to look at its own locally-available information.

That is, the security context enables the endpoint 610 to combine or correlate evidence from security assessments received from a variety of different sources, and across object types, in order to significantly enhance the quality of its detection of potential security incidents. The endpoint 610 then makes a decision as to what local action or response is appropriate for each type of security assessment (whether received from another endpoint or internally generated by the endpoint itself) in accordance with a set of response policies. Incident detection is both efficient and cost-effective because the security context enables distributed processing of enterprise-wide information, in the form of security assessments, without the burden of sharing large amounts of raw data throughout the enterprise (most of which is completely irrelevant due to the lack of any context). The endpoints 610 are further arranged to roll-back the local action upon expiration of the security assessment that prompted the local action (i.e., when the security assessment exceeds the time-to-live specified in the TTL field).

In this illustrative example, the guest machine 205 is also configured as a subscriber to security assessments received over the security assessment channel 605 which identify security incidents involving the host machine 210. Accordingly, the security assessment channel 605 may be virtually and logically extended to the guest machine through the VPN/SSL connection or using global SCM access, for example.

Figure 7:
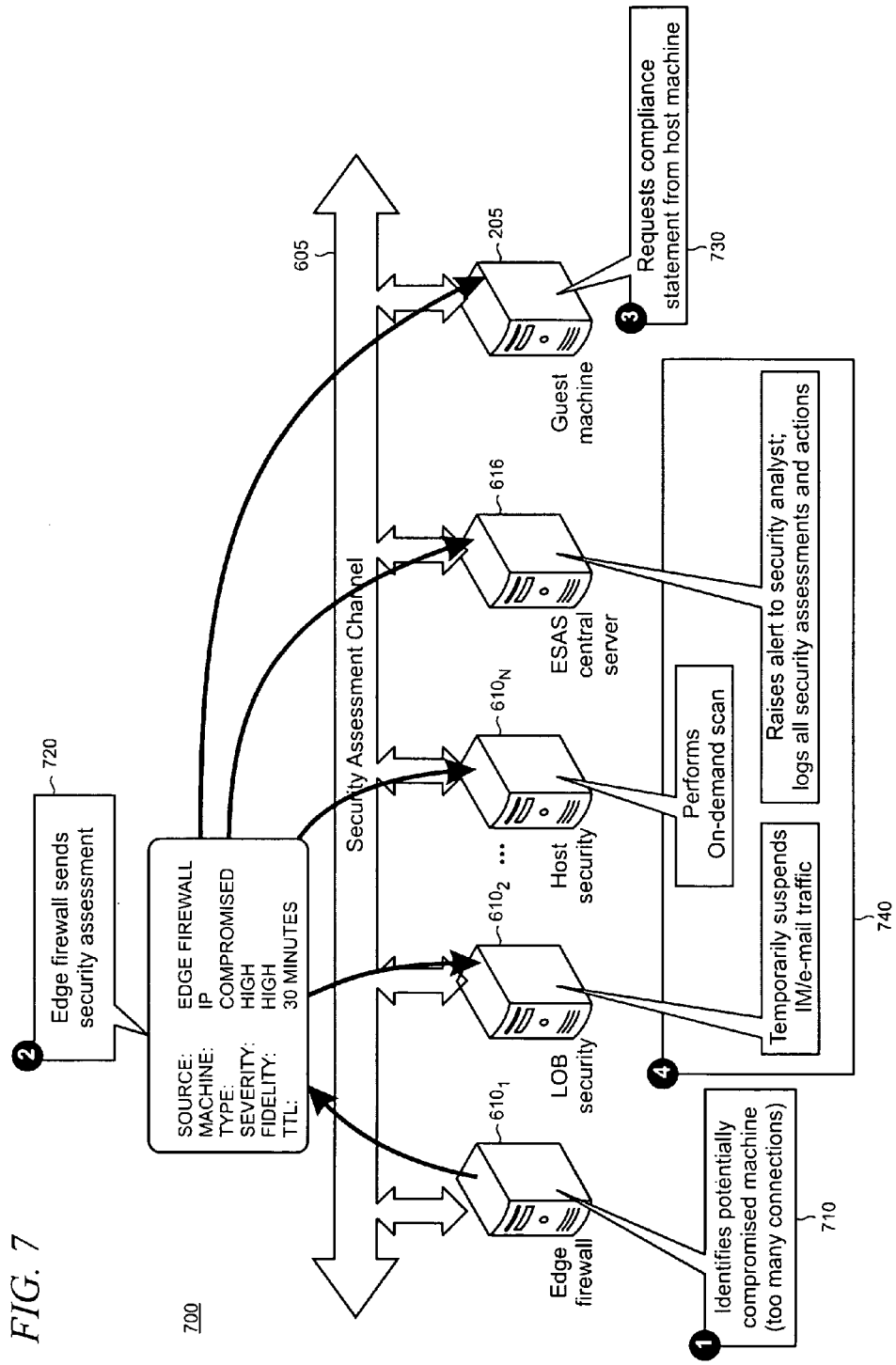
FIG. 7 shows an illustrative scenario in which a security assessment is used to trigger a check of the compliance of the host machine with applicable policies.

FIG. 7 shows an illustrative scenario 700 in which a security assessment is used to trigger a check of the compliance of the host machine with applicable policies. Scenario 700 may be described in four stages. As indicated by reference numeral 710, the edge firewall $610_1$ first identifies that the host machine 210 is potentially compromised, for example, because the host creates so many connections to the Internet 242 that the most likely explanation for the behavior is the existence of a security compromise.

Second, the edge firewall $610_1$ sends a security assessment that indicates the suspicion that the host machine is "compromised" with high severity and high fidelity, as indicated by reference numeral 720, over the security assessment channel 605 to subscribing endpoints 610. Third, as the guest machine 205 is a subscriber to security assessments that involve its host, it will receive the security assessment 720 over the security assessment channel 605. The security assessment 720 gives rise to a suspicion that the root partition on the host machine contains malware that is making the connections for malicious purposes. If such suspicion is confirmed, the virtualization environment may be unhealthy and the guest machine 205 could be at risk. Accordingly, the received security assessment 720 may be used to trigger a request from the guest health agent 312 for the host health agent 305 to perform a health check of the host machine 210. The host health agent 305 will perform the check responsively to the request and provide a compliance statement 320 to indicate the results to the guest health agent 312. If the compliance statement 320 indicates an issue, then the user may be notified so that remediation can be effectuated.

In addition, in some implementations the subscribing endpoints $610_{1, 2 \ldots N}$ and the ESAS central server 616 receiving the security assessment 720 may be utilized to apply specific security expertise through the application of their own correlation rules and locally-available data to trigger an action. The actions of the endpoints 610 can be performed on the guest machine 205 to check if the guest has been compromised by the security incident that is detected on the host machine, remediate any compromise, and/or isolate the guest machine from the corpnet or other IT objects until it is verified as being healthy. The actions taken by the endpoint 610 may be alternatively applied to the host machine 210, while in some implementations both the guest machine 205 and host machine 210 may be the subjects of the actions. Typically, the particular actions taken and the IT objects on which they are applied will be governed by the response policies that are configured and implemented in a corpnet or enterprise environment.

As collectively indicated by reference numeral 740 in FIG. 7, the actions taken by the endpoints 610 in response to the received security assessment illustratively include the host security endpoint $610_N$ performing an on-demand anti-virus scan. In addition, as shown, the line-of-business security endpoint $610_2$ may temporarily suspend instant messaging ("IM") or e-mail traffic. The ESAS central server 616 raises an alert for a security analyst (e.g., an administrator) and also logs the security assessment and all the actions invoked. It is emphasized that these actions are intended to be illustrative and that other actions taken by other endpoints may be utilized to meet the needs of a given implementation or usage scenario.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of operating a guest machine created in a child partition operating on a host machine, the method comprising the steps of:
    initiating a boot process of the guest machine on the child partition of the host machine;
    during the boot process of the guest machine, a guest health agent running on the guest machine communicating with a host health agent operating on a root partition on the host machine to request the host health agent to check a health of the host machine;
    in response to requesting the host health agent to check the health of the host machine, performing the health check of the host machine to determine compliance of the host machine to a compliance policy;
    providing a compliance statement from the host health agent to the guest health agent;
    comparing, by the guest health agent, the compliance statement received from the host health agent against to the compliance policy;
    wherein compliance with the compliance policy indicates that the guest machine will be operable on the host machine without having security of the guest machine being disrupted or compromised;
    if during the boot process the host machine is determined by the guest machine to be in compliance with the compliance policy, completing the boot process of the guest machine in the child partition to create a virtualization environment; and
    if during the boot process the host machine is determined by the guest machine to be non-compliant with the compliance policy, terminating the boot process of the guest machine in the child partition.

2. The method of claim 1 in which the host health agent is configured for checking one or more factors that are indicative of the host machine's health.

3. The method of claim 2 in which the one or more factors include at least one of security patch status, presence of anti-virus software, presence of anti-malware software, virus signature status, malware signature status, presence of certificate or file registry key that is indicative that the host machine is certified to run the guest machine, presence of a firewall, or configuration status of the firewall.

4. The method of claim 1 including a further step of receiving instructions stored on a computer-readable device that, when executed by one or more processors disposed on the host machine, implement the host health agent or the guest health agent.

5. The method of claim 4 in which the computer-readable device is a storage device that further includes a desktop image that is used in the virtualization environment.

6. The method of claim 5 in which the desktop image includes one or more of the compliance policy, data, user settings, user preferences, or applications.

7. The method of claim 1 including a further step of receiving the compliance policy from a compliance policy server.

8. The method of claim 1 including a further step of displaying an error message when the host machine is determined to be non-compliant, the error message indicating the host machine's non-compliancy with the compliance policy and providing notice that remediation of the non-compliancy may be performed.

* * * * *